(12) United States Patent
Narendra et al.

(10) Patent No.: US 7,282,966 B2
(45) Date of Patent: Oct. 16, 2007

(54) FREQUENCY MANAGEMENT APPARATUS, SYSTEMS, AND METHODS

(75) Inventors: Siva G. Narendra, Portland, OR (US); James W. Tschanz, Portland, OR (US); Vivek K. De, Beaverton, OR (US); Nasser A. Kurd, Portland, OR (US); Javed Barkatullah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/953,199

(22) Filed: Sep. 28, 2004

(65) Prior Publication Data

US 2006/0066376 A1  Mar. 30, 2006

(51) Int. Cl.
*H03K 17/00* (2006.01)

(52) U.S. Cl. .................... 327/99; 327/544; 713/300; 713/322

(58) Field of Classification Search ............... 327/99, 327/159, 407, 544; 713/300, 322
See application file for complete search history.

(56) References Cited

U.S. PATENT DOCUMENTS

| | | | | |
|---|---|---|---|---|
| 4,908,760 A | * | 3/1990 | Sinn ..................... 700/90 |
| 5,189,314 A | * | 2/1993 | Georgiou et al. ........... 327/114 |
| 5,426,755 A | * | 6/1995 | Yokouchi et al. .......... 711/101 |
| 5,451,892 A | * | 9/1995 | Bailey ................... 327/113 |
| 5,485,127 A | * | 1/1996 | Bertoluzzi et al. ........ 331/69 |
| 5,490,059 A | * | 2/1996 | Mahalingaiah et al. ...... 700/46 |
| 5,600,228 A | * | 2/1997 | Matsubayashi et al. ..... 320/155 |
| 5,625,311 A | * | 4/1997 | Nakatsu ................. 327/293 |
| 5,664,201 A | * | 9/1997 | Ikedea .................. 713/320 |
| 5,721,837 A | * | 2/1998 | Kikinis et al. ........... 710/303 |
| 5,724,592 A | * | 3/1998 | Garner .................. 713/322 |
| 6,216,235 B1 | * | 4/2001 | Thomas et al. ........... 713/501 |
| 6,311,287 B1 | * | 10/2001 | Dischler et al. .......... 713/601 |
| 6,715,089 B2 | * | 3/2004 | Zdravkovic .............. 713/322 |
| 2003/0079152 A1 | * | 4/2003 | Triece .................. 713/322 |
| 2005/0138444 A1 | * | 6/2005 | Gaskins ................. 713/300 |

* cited by examiner

*Primary Examiner*—Dinh T. Le
(74) *Attorney, Agent, or Firm*—Schwegman, Lundberg & Woessner, P.A.

(57) ABSTRACT

Apparatus and systems, as well as methods and articles, may operate to select a microprocessor clock frequency responsive to a desired voltage and/or a desired temperature of operation.

25 Claims, 3 Drawing Sheets

FREQUENCY MANAGEMENT APPARATUS, SYSTEMS, AND METHODS

TECHNICAL FIELD

Various embodiments described herein relate to circuits generally, including apparatus, systems, and methods used to clock such circuits.

BACKGROUND INFORMATION

During the operation of a microprocessor, operational parameters such as core temperature, voltage of operation, and power consumption may vary according to activity within the microprocessor. Relatively higher levels of activity may be associated with computationally-intensive tasks, may increase power consumption and core temperature, and may result in supply voltage "droops" (downward changes). Circuit delays within the microprocessor may increase as the core temperature increases and the operational voltage decreases.

On the other hand, some applications may use only modest amounts of available microprocessor capacity. Thus, a conservatively clocked microprocessor may be capable of reliable operation at a higher frequency.

DETAILED DESCRIPTION

Various embodiments disclosed herein may enable adjusting a microprocessor frequency of operation according to sensed operational parameters including, without limitation, temperature and/or operational voltage. In some embodiments, a phase-locked loop (PLL) may provide a variable rate clock.

Several mechanisms may be used to implement clock variability. For example, a microprocessor may experience operational voltage droops with time constants on the order of about 10-1000 nanoseconds. A PLL capable of re-locking within such a short time may not be widely available. In addition, undershot/overshoot of the PLL during re-lock may cause operational errors.

Therefore, some embodiments disclosed herein may utilize multiple PLLs as a bank of available clocks. Any number of PLLs in the bank may be pre-locked to a frequency anticipated for possible future use. Microprocessor clock frequency changes may then be accomplished by selecting a PLL pre-locked to the required frequency, avoiding a number of idle clock cycles that might be incurred during PLL re-lock activity. In some embodiments, certain PLLs which are not currrently selected for microprocessor clocking may be independently pre-locked (or re-locked) during operation to various frequency ranges, perhaps according to trends of sensed operational parameters including (but not limited to) supply voltage, component temperature, detected energy state transitions, electromagnetic fields, and plasma energy levels.

Some embodiments may utilize a first subset of available operational parameters (e.g., operational voltage and component temperature) to adjust a second subset of operational parameters (e.g., power supply voltage and clock frequency) to enhance performance according to a third subset of operational parameters (e.g., the average number of a pre-determined set of instructions executed per second over a pre-determined length of time (a benchmark)).

Figure 1:
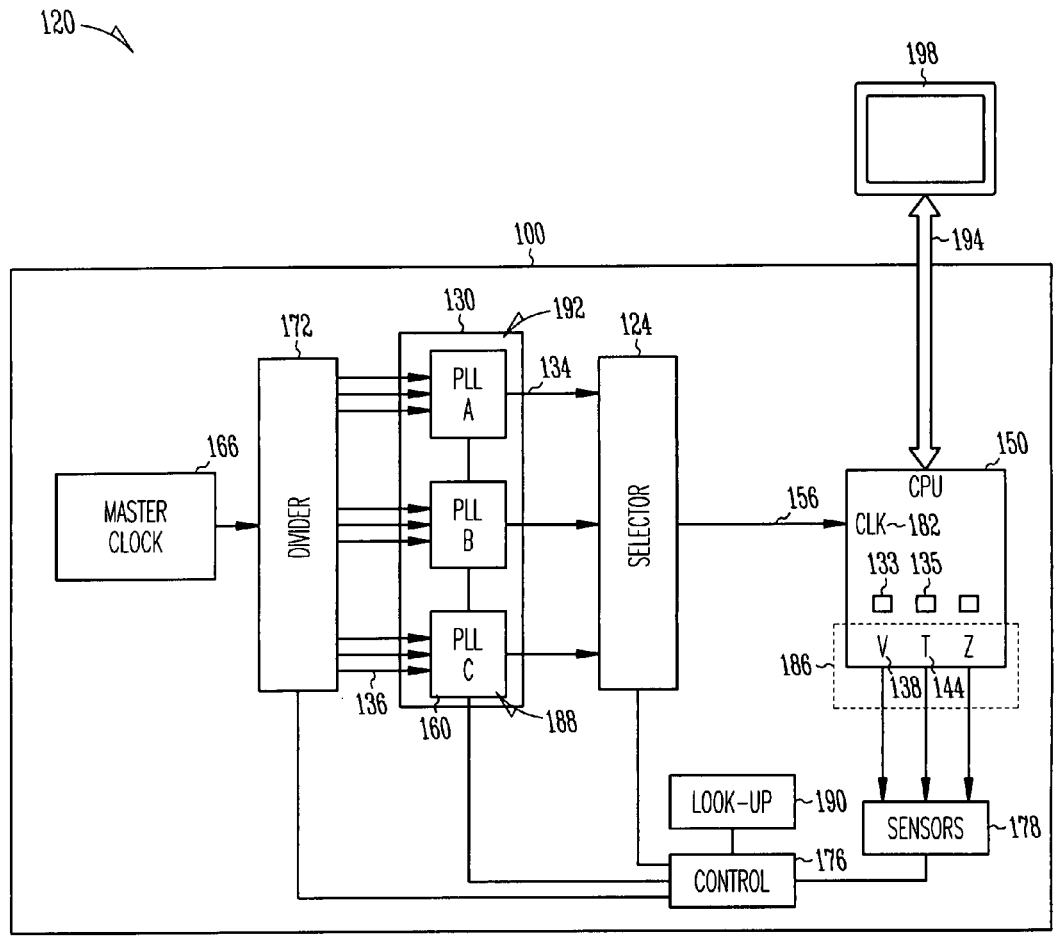
FIG. 1 comprises a diagram of an apparatus and a system according to various embodiments of the invention.

FIG. 1 is a diagram of an apparatus 100 and a system 120 according to various embodiments of the invention. For example, the apparatus 100 may include a selector 124 coupled to a plurality of clocks 130 to select a microprocessor clock frequency 134. The microprocessor clock frequency 134 may be responsive to a desired voltage to be applied to a first component 133, a desired temperature of operation of a second component 135, or both. In some embodiments of the apparatus 100, the desired voltage may comprise a power supply voltage. A first component and/or a second component may include, without limitation, a microprocessor, a microprocessor core, a microprocessor core subsystem, and/or a component or system external to a microprocessor, such as a peripheral controller or bus controller. In some embodiments, parameters other than, or in addition to a desired voltage and/or temperature may by used to select the microprocessor clock frequency 134. Some embodiments of the apparatus 100 may include a microprocessor 150 coupled to receive a selected output 156 of one of the plurality of clocks 130.

In some embodiments of the apparatus 100, at least one of the plurality of clocks 130 may comprises a phase-locked loop (PLL) 160. The apparatus 100 may include a master clock 166 as well as a frequency divider 172 coupled to the master clock 166 and/or to the PLL 160. The apparatus 100 may also include a control module 176 coupled to the selector 124 and/or to a plurality of sensors 178 to select a microprocessor clock 188 with a microprocessor clock frequency 134 responsive to at least one of a plurality of sensor data 186. The apparatus 100 may further include a look-up module 190 coupled to the control module 176 to associate the plurality of sensor data 186 with a desired voltage, a desired temperature, and/or to a selected microprocessor clock frequency 134.

It should be noted that in some embodiments of the apparatus 100, the microprocessor clock 188 may comprise a PLL 160 pre-locked to an anticipated clock frequency 136. In some embodiments of the apparatus 100, the plurality of clocks 130 may comprise an integrated circuit 192. Other embodiments may also be realized.

For example, a system 120 may include an apparatus, similar to or identical to the apparatus 100 previously described, as well as a bus 194 and/or the selector 124 coupled to the plurality of clocks 130 (to select the microprocessor clock frequency 134). The system 120 may also include a microprocessor 150 coupled to the bus 194 as well as to the selector 124. The microprocessor 150 may include a clock input 182 associated with the microprocessor clock frequency 134 (e.g., to receive the selected output 156 of one of the plurality of clocks 130). In some embodiments, the system 120 may include a display 198 coupled to the bus 194. As noted above, one or more of the plurality of clocks 130 of the system 120 may comprise a phase-locked loop (PLL) 160.

In some embodiments, the system 120 may also include a master clock 166, as well as a frequency divider 172 coupled to the master clock 166 and/or to the PLL 160. The system 120 may further include a control module 176 coupled to the selector 124 and/or to a plurality of sensors 178 to select the microprocessor clock frequency 134 responsive to at least one of a plurality of sensor data 186.

It should be noted that the plurality of sensor data 186 may comprise a sensed microprocessor operating voltage 138 and/or a sensed microprocessor operating temperature 144, among other parameters. The system 120 may also include a look-up module 190 coupled to the control module 176 to associate the sensed microprocessor operating voltage 138, a desired microprocessor operating voltage, the sensed microprocessor operating temperature 144, a desired microprocessor operating temperature, and/or a microprocessor clock frequency 134, among others.

The apparatus 100, system 120, selector 124, plurality of clocks 130, clock frequency 134, anticipated clock frequency 136, sensed operating voltage 138, sensed operating temperature 144, microprocessor 150, output 156, plurality of clocks 130, phase-locked loop (PLL) 160, master clock 166, frequency divider 172, control module 176, plurality of sensors 178, clock input 182, sensor data 186, clock 188, look-up module 190, integrated circuit 192, bus 194, and display 198 may all be characterized as "modules" herein.

Such modules may include hardware circuitry, and/or a processor and/or memory circuits, software program modules and objects, and/or firmware, and combinations thereof, as desired by the architect of the apparatus 100, system 120, and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to simulate the operation of various potential embodiments.

It should also be understood that the apparatus and systems of various embodiments can be used in applications other than frequency management implementations, and thus various embodiments are not to be so limited. The illustrations of apparatus 100 and system 120 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as subcomponents within a variety of electronic systems, such as televisions, cellular telephones, personal computers, workstations, radios, video players, vehicles, and others. Some embodiments may include a number of methods.

Figure 2:
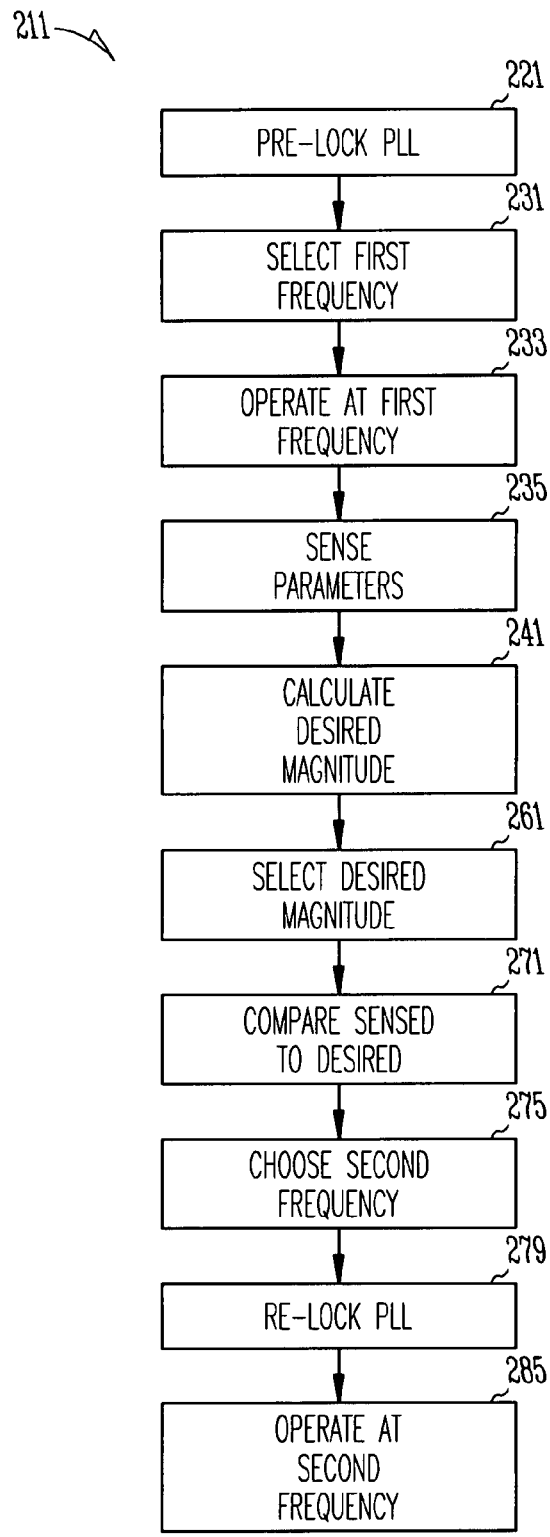
FIG. 2 comprises a flow diagram illustrating several methods according to various embodiments of the invention.

For example, FIG. 2 is a flow diagram illustrating several methods 211 according to various embodiments of the invention. Thus, a method 211 may (optionally) begin at block 221 with pre-locking each one of a plurality of PLLs to a corresponding one of a plurality of anticipated clock frequencies. The plurality of PLLs may thus generate a plurality of clock frequencies.

The method 211 may continue with selecting a first clock frequency from the plurality of clock frequencies at block 231, and operating a microprocessor at the first clock frequency at block 233. It should be further noted that selecting a clock frequency may include de-coupling a first PLL from the microprocessor and coupling a second PLL to the microprocessor.

The method 211 may also include sensing a magnitude of at least one of a plurality of clock rate-dependent parameters associated with the operation of the microprocessor at the first clock frequency at block 235. The plurality of clock rate-dependent parameters may comprise at least one of a power supply voltage and a core temperature. The magnitude may be sensed at a variety of intervals, depending on the clock rate-dependent parameter(s) selected for observation. For example, the magnitude of the microprocessor operating voltage may be sensed with a periodicity of less than about ten milliseconds. The magnitude of the microprocessor operating temperature may be sensed with a periodicity of less than about ten seconds.

The method 211 may include calculating a desired magnitude from a plurality of microprocessor operating characteristics at block 241 and/or selecting the desired magnitude at block 261. Alternatively, or in addition, the desired magnitude may be selected from a look-up table. The method 211 may include comparing the sensed magnitude to the desired magnitude at block 271.

In some embodiments, the method 211 may continue at block 275 by choosing a second anticipated clock frequency according to a detected trend of at least one of the plurality of clock rate-dependent parameters, and by re-locking at least one of the plurality of PLLs to the second anticipated clock frequency at block 279. The method 211 may (optionally) conclude by operating the microprocessor at a second clock frequency selected to adjust the sensed magnitude to approximate the desired magnitude at block 285.

It should be noted that transitioning between operating a microprocessor at a first clock frequency and a second clock frequency may occur during a period of less than about two cycles of the greater of the first clock frequency and the second clock frequency. As stated previously, each one of a plurality of clock frequencies may be associated with at least one of the plurality of phase-locked loops (PLLs).

The methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 3:
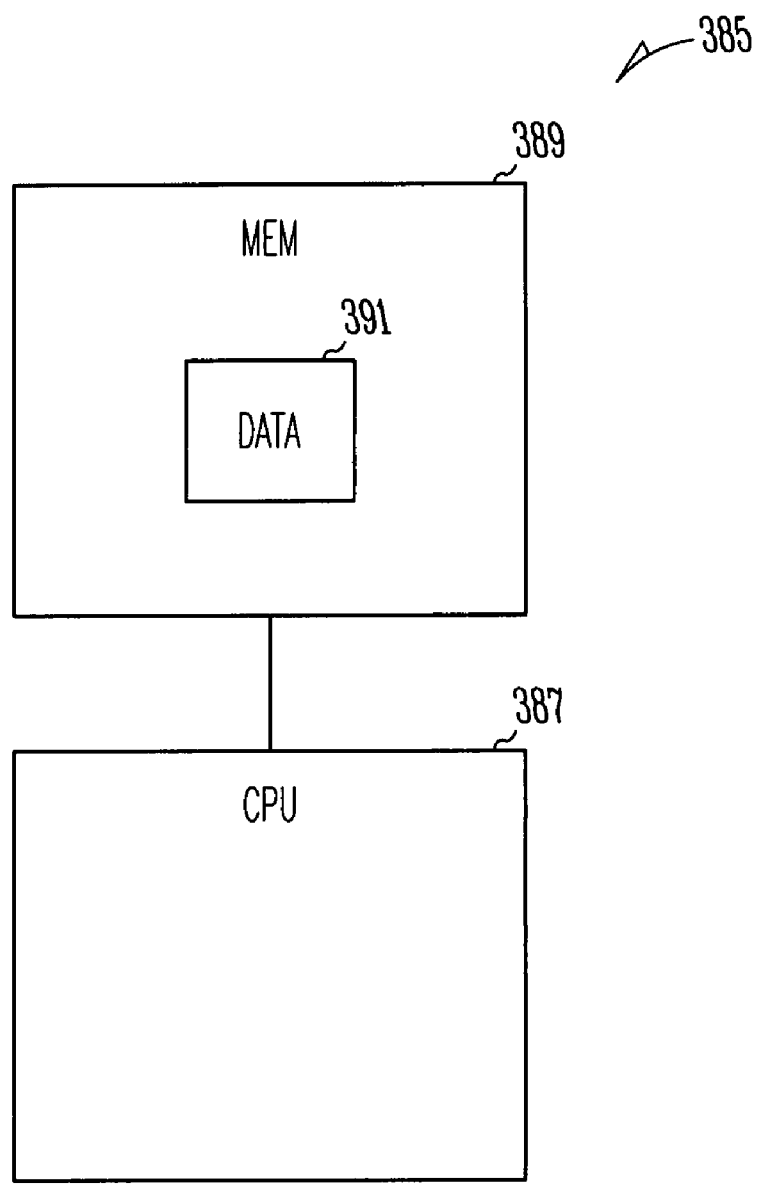
FIG. 3 comprises a block diagram of an article according to various embodiments of the invention.

For example, FIG. 3 is a block diagram of an article 385 according to various embodiments of the invention. Examples of such embodiments may comprise a computer, a memory system, a magnetic or optical disk, some other storage device, and/or any type of electronic device or system. The article 385 may include a processor 387 coupled to a machine-accessible medium such as a memory 389 (e.g., a memory including an electrical, optical, or electromagnetic conductor) having associated information 391 (e.g., computer program instructions and/or data), which, when accessed, results in a machine (e.g., the processor 387) performing such actions as operating a microprocessor at a first clock frequency selected from a plurality of clock frequencies.

Other activities may include, for example, sensing the magnitude of at least one of a plurality of clock rate-dependent parameters associated with the operation of the microprocessor at the first clock frequency, comparing the sensed magnitude to a desired magnitude to choose a second clock frequency, and operating the microprocessor at the second clock frequency to adjust the sensed magnitude to approximate the desired magnitude. Some activities may include selecting the desired magnitude from a look-up table, and/or calculating the desired magnitude from a plurality of microprocessor operating characteristics, among others. As previously noted, the sensed magnitude may comprise a microprocessor operating voltage sensed with a periodicity of less than about ten milliseconds, and/or a microprocessor operating temperature sensed with a periodicity of less than about ten seconds, among others.

Further activities may include pre-locking a first PLL selected from the plurality of PLLs to a first anticipated clock frequency to make available a first clock frequency, and/or pre-locking a second PLL selected from the plurality of PLLs to a second anticipated clock frequency to make available a second clock frequency. Other activities may include coupling the first PLL to the microprocessor, decoupling the first PLL from the microprocessor, and coupling/decoupling the second PLL to the microprocessor.

Implementing the apparatus, systems, and/or methods disclosed herein may result in establishing a preferred level of microprocessor utilization by implementing a clocking frequency according to selected operating characteristics.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, including:
   at least one sensor including a voltage sensor coupled to a microprocessor to generate a sense signal related to at least one of a voltage sensed at the microprocessor or a temperature sensed at the microprocessor;
   a control module coupled to the at least one sensor to generate a control signal responsive to the sense signal to control a selection of a clock signal to be input to the microprocessor;
   a look-up module coupled to the control module to associate the at least one of the voltage sensed at the microprocessor or the temperature sensed at the microprocessor to at least one of a desired voltage, a desired temperature, or a desired frequency of operation of the microprocessor; and
   a selector coupled to the control module to select the clock signal from a plurality of clock signals associated with a plurality of clocks to cause the microprocessor to operate at a rate such as to drive at least one of the voltage sensed at the microprocessor toward the desired voltage or the temperature sensed at the microprocessor toward the desired temperature.

2. The apparatus of claim 1, wherein the desired voltage comprises a power supply voltage.

3. The apparatus of claim 1, wherein the microprocessor is coupled to the selector to receive the selected clock signal.

4. The apparatus of claim 1, wherein at least one of the plurality of clocks comprises a phase-locked loop (PLL).

5. The apparatus of claim 4, further including:
   a master clock; and
   a frequency divider coupled to the master clock and to the PLL.

6. The apparatus of claim 1, wherein the clock signal comprises an output of a PLL pre-locked to an anticipated clock signal of an anticipated frequency.

7. The apparatus of claim 1, wherein the plurality of clocks comprises an integrated circuit.

8. A system, including:
   at least one sensor including a voltage sensor coupled to a microprocessor to generate a sense signal related to at least one of a voltage sensed at the microprocessor or a temperature sensed at the microprocessor;
   a control module coupled to the at least one sensor to generate a control signal responsive to the sense signal to control a selection of a clock signal to be input to the microprocessor;
   a look-up module coupled to the control module to associate the at least one of the voltage sensed at the microprocessor or the temperature sensed at the microprocessor to at least one of a desired voltage, a desired temperature, or a desired frequency of operation of the microprocessor;

a selector coupled to the control module to select the clock signal from a plurality of clock signals associated with a plurality of clocks to cause the microprocessor to operate at a rate such as to drive at least one of the voltage sensed at the microprocessor toward the desired voltage or the temperature sensed at the microprocessor toward the desired temperature; and a display operatively coupled to the microprocessor.

9. The system of claim 8, wherein at least one of the plurality of clocks comprises a phase-locked loop (PLL).

10. The system of claim 9, further including:
a master clock; and
a frequency divider coupled to the master clock and to the PLL.

11. A method, including:
operating a microprocessor at a first frequency associated with a first clock signal selected from a plurality of clock signals output from a bank of pre-locked phase-locked loop (PLL) clocks;
sensing a magnitude of at least one clock rate-dependent parameter including a voltage associated with the operation of the microprocessor at the first frequency;
selecting a desired magnitude of the at least one clock rate-dependent parameter from a look-up table;
comparing the sensed magnitude to the desired magnitude of the at least one clock rate-dependent parameter, wherein a result of the compare operation is used to choose a second clock signal of a second frequency, the second clock signal selected from the plurality of clock signals output from the bank of pre-locked PLL clocks; and
operating the microprocessor at the second frequency to adjust the sensed magnitude to approximate the desired magnitude.

12. The method of claim 11 further including:
selecting the first clock signal from the plurality of clock signals.

13. The method of claim 11 wherein the at least one clock rate-dependent parameter comprises at least one of a power supply voltage or a core temperature.

14. The method of claim 11, wherein each one of the plurality of clock signals is output from a PLL associated with the bank of PLLs.

15. The method of claim 11, further including:
pre-locking at least one PLL of the bank of PLLs to a first anticipated clock signal of a first anticipated frequency.

16. The method of claim 15, further including:
re-locking the at least one PLL of the bank of PLLs to a second anticipated clock signal of a second anticipated frequency prior to operating the microprocessor at the second anticipated frequency.

17. The method of claim 16, further including:
choosing the second anticipated clock signal of the second anticipated frequency according to a detected trend of the at least one clock rate-dependent parameter.

18. The method of claim 17, wherein the detected trend comprises a rate-of-change.

19. The method of claim 11, further including:
transitioning between operating the microprocessor at the first frequency associated with the first clock signal and the second frequency associated with the second clock signal during a period of less than about two cycles of the greater of the first frequency and the second frequency.

20. A computer readable medium having instructions stored thereon which, when executed by a processor, cause the processor to perform activities including:
operating a microprocessor at a first frequency associated with a first clock signal selected from a plurality of clock signals output from a bank of pre-locked phase-locked loop (PLL) clocks;
sensing a magnitude of at least one clock rate-dependent parameter including a voltage associated with the operation of the microprocessor at the first frequency;
selecting a desired magnitude of the at least one clock rate-dependent parameter from a look-up table;
comparing the sensed magnitude to the desired magnitude of the at least one clock rate-dependent parameter, wherein a result of the compare operation is used to choose a second clock signal of a second frequency, the second clock signal selected from the plurality of clock signals output from the bank of pre-locked PLL clocks; and
operating the microprocessor at the second frequency to adjust the sensed magnitude to approximate the desired magnitude.

21. The computer readable medium of claim 20, wherein the instructions, when executed by the processor, cause the processor to perform activities including:
pre-locking a first PLL selected from the bank of PLLs to a first anticipated clock signal of a first anticipated frequency to make the first clock signal immediately available at the first anticipated frequency; and
pre-locking a second PLL selected from the bank of PLLs to a second anticipated clock signal of a second anticipated frequency to make the second clock signal immediately available at the second anticipated frequency.

22. The computer readable medium of claim 21, wherein the instructions, when executed by the processor, cause the processor to perform activities including:
coupling the first PLL to the microprocessor;
de-coupling the first PLL from the microprocessor; and
coupling the second PLL to the microprocessor.

23. The computer readable medium of claim 20, wherein the instructions, when executed by the processor, cause the processor to perform activities including:
calculating the desired magnitude of the at least one clock rate-dependent parameter from a plurality of microprocessor operating characteristics.

24. The computer readable medium of claim 20, wherein the sensed magnitude of the at least one clock rate-dependent parameter is a microprocessor operating voltage sensed with a periodicity of less than about ten milliseconds.

25. The computer readable medium of claim 20, wherein the sensed magnitude of the at least one clock rate-dependent parameter is a microprocessor operating temperature sensed with a periodicity of less than about ten seconds.

* * * * *